United States Patent [19]

Coleman

[11] 3,961,083

[45] June 1, 1976

[54] MEAT FLAVORED VEGETABLE PROTEIN PRODUCT

[75] Inventor: Henry Evans Coleman, Salt Lake City, Utah

[73] Assignee: Marian Berkley, Salt Lake City, Utah ; a part interest

[22] Filed: Oct. 24, 1974

[21] Appl. No.: 517,549

[52] U.S. Cl.................................. 426/92; 426/307
[51] Int. Cl.² ...................... A23L 1/22; A23D 5/00
[58] Field of Search ............... 426/92, 307, 93, 362, 426/199, 202

[56] References Cited

UNITED STATES PATENTS

| | | | |
|---|---|---|---|
| 3,485,636 | 12/1969 | Hoffman | 426/362 |
| 3,615,656 | 10/1971 | Alden | 426/65 |
| 3,736,148 | 5/1973 | Katz | 426/197 |

*Primary Examiner*—James R. Hoffman
*Attorney, Agent, or Firm*—Criddle & Thorpe

[57] ABSTRACT

A meat flavored vegetable protein product comprising a textured deflavored vegetable protein having absorbed thereon a rendered animal fat, said protein optionally being admixed with a seasoned sauce.

15 Claims, No Drawings

MEAT FLAVORED VEGETABLE PROTEIN PRODUCT

BRIEF DESCRIPTION OF THE INVENTION

Field of the Invention

This application relates to high protein, meat flavored, textured vegetable protein products. More specifically, this invention relates to high protein, meat flavored, textured vegetable protein products which may also be mixed with a sauce and to a method of preparing the same.

With the current problems of meat shortages and soaring meat prices has arisen the demand for meat substitutes which are nutritionally equal to or better than meat but which are not as costly.

As a partial response to this demand, many so-called "protein" food supplements have been developed. These are usually considered to be meat extenders and are utilized in conjunction with meat such as hamburger, sausage, and the like. The most commonly used meat extenders are the textured vegetable protein "TVP" products. These textured vegetable proteins are derived from various grains and vegetables, each having a distinctive flavor. A commonly used TVP is derived from soybeans. Since it has not been possible to duplicate the distinctive meat flavor from the high protein vegetable material, it has been necessary to utilize sufficient meat to provide the flavor.

It is an object of the present invention to provide a substitute meat product having a meat flavor which does not require the addition of meat.

It is also an object of the present invention to provide a process for the preparation of a high protein texturized vegetable material which has a meat-like flavor.

A further object of the invention is to provide a meat substitute which can be mixed with a sauce and used as a barbeque meat-like product.

These and other objects of the invention will be obvious from the followingg description and examples.

DETAILED DESCRIPTION OF THE INVENTION

It has now been found that a texturized vegetable protein product having a meat-like texture can be given a meat-like flavor and utilized as a high protein meat substitute. This is accomplished by first deflavorizing the textured vegetable protein and then absorbing thereon a minor proportion of rendered animal fat. The product then acquires flavor from the animal fat. In other words, a deflavorized textured vegetable protein granules mixed with rendered beef fat will assume the flavor of hamburger and can be seasoned and used the same as hamburger for soups, stews, casseroles, barbecue mixes and the like. The same deflavored textured vegetable protein can be mixed with lard or fat from cured hams and properly seasoned to acquire a sausage or ham taste.

A preferred use of the products of this invention is in admixture with sauce as a barbeque product from which sandwiches, "sloppy joes", chili beans, and the like may be made.

There are certain critical steps which must be observed in the manufacture of the products of this invention. For example, the deflavorizing steps of the process require that the texturized vegetable protein be in particles which are about ** inch in diameter or greater. Otherwise the product will tend to disintegrate and become too mushy.

Any texturized vegetable protein may be utilized. Because of the availability of TVP derived from soybeans, the examples will be directed to this source but the invention is not limited to such.

In preparing the products of this invention the TVP is deflavorized by placing the dried TVP in a vessel covering the protein with water and heating the vessel until the TVP is fully hydrated and the water starts to boil. It is important that the TVP be both fully hydrated and heated to the boiling point of the water. Heretofore, it was known to hydrate TVP by soaking it in water for a certain length of time, but the process used herein is different. The complete hydration plus heating to the boiling point is important to rid the TVP of the vegetable flavor and produce a product having the desired tenderness. Obviously, different lengths of time are going to be needed to bring the different TVP-water mixtures to a boil depending upon the volume of water, amount of TVP, and heat source. It would therefore be useless to attempt to state that a TVP-water mixture should be heated for a certain time period. It will be obvious to one with ordinary skill in the art when the TVP product is fully hydrated and the boiling point of the water reached.

After boiling, the partially deflavored TVP is drained and rinsed with a water rinse wherein further deflavoring occurs.

The rinsed TVP is then treated with a rinse consisting of a dilute solution of baking soda (sodium bicarbonate), i.e., about 1 tablespoon to 3 cups of soda per 5 gallons of water. This further deflavorizes the TVP.

The treated deflavorized TVP product is allowed to drain and is then partially dehydrated by placing the TVP in a press, centrifuge or equivalent means and removing excess water. The operation is carried out so that the loosely held water is removed but the texture of the protein is not destroyed.

The deflavorized TVP particles thus obtained have a minimum diameter of about ½ inch. These particles are comminuted by means of a rotary chopper or its equivalent until particles about the size of chopped beef are obtained. These particles are then ready to be treated with the rendered fat.

Any suitable animal fat may be utilized. Beef fat surrounding the kidneys has been found to be particularly useful. The choice and amount of fat are best determined empirically but will in general be present in a weight ratio of rendered fat to deflavorized TVP of about 1:9 to 1:2.

The rendered fat is melted and poured into the TVP with constant stirring or agitation to evenly distribute the fat onto the TVP particles. The product thus obtained has a meat-like texture and flavor which may be seasoned by spices, salts, and/or sauces.

As already stated, a particularly useful product comprises a mixture of the TVP containing the absorbed fat with a barbeque sauce. The sauce may be present in any desired quantity and specific proportions are not necessary to define this invention. For example, weight ratios of sauce to fat absorbed TVP of 1:2 to 2:1 may be used as may other proportions. The barbeque mixture thus obtained is ready for use. All one has to do is heat and serve. If desired, the mixture may be frozen and kept for extended periods of time without any loss in quality or flavor.

The invention is illustrated by the following examples, but is not to be limited thereby.

EXAMPLE I

Into a container was placed 22 lbs. of a TVP derived from soybeans having an average particle diameter of about 1 inch. Sufficient water was added to cover the TVP and heat applied until the water started to boil (about 60 minutes). The water was then drained from the hydrated TVP particles. The TVP particles were rinsed with about 30 gallons of cold water and drained. A final rinse of 30 gallons of water containing ⅔ cup of sodium bicarbonate was carried out.

The TVP particles were then placed in a press and partially dehydrated. Sufficient pressure was applied to remove the water loosely held in the particles but not so much as to crush or mash the TVP. After the dehydration step the TVP was comminuted in a rotary chopper into particles about the size of chopped beef.

A sauce was prepared by mixing together five No. 10 cans of ketchup, 5 cups of worcestershire sauce, 4 cups of vinegar, 5 pounds of brown sugar, 3 liquid ounces of liquid smoke flavoring, ¼ cup of powdered dry mustard and 2 cups of chili powder. Thirteen pounds of the comminuted deflavored TVP particles were thoroughly mixed with 3½ pounds of hot rendered beef fat until the fat was completely absorbed on the TVP. To this mixture was added 11½ pounds of the sauce to form a complete non-meat beef tasting barbeque mixture having a beef-like texture.

Similar meat tasting products may be obtained using varying amounts of fat and sauce relative to the amount of TVP. Fats from other animals, such as pork, ham fat, poultry and the like, can be substituted for the beef to obtain similar meat flavored barbeque products.

EXAMPLE II

The product obtained in Example I was made into a barbeque sandwich by placing about ¼ pound of mixture between two slices of bread or between bun slices, wrapped and refrigerated until ready for consumption.

EXAMPLE III

The product obtained in Example I was heated and served on an open-faced bun or between bun slices as a hot barbeque sandwich.

EXAMPLE IV

The product obtained in Example I was added to chili beans (red beans, kidney beans, and the like) which had been soaked in water overnight and cooked until the beans were tender to produce a TVP meat flavored chili product.

EXAMPLE V

The procedure of Example I was followed with the exception that ham fat was used in the place of the beef fat. The barbeque mix obtained had a ham flavor.

While the above examples refer to TVP barbeque mixes, it will be appreciated that other uses can also be made from the meat flavored TVP products. For example, the meat flavored TVP particles can be used in stews, soups and the like, as a complete meat substitute. Other sauces can also be used.

What is claimed is:

1. A textured vegetable protein product having a meat flavor comprising a major amount of hydrated deflavored textured vegetable protein which has been subjected to partial dehydration and has then had absorbed thereon, as a flavoring material, a minor amount of a rendered animal fat.

2. The product claimed in claim 1 wherein the protein product is additionally seasoned by one or more seasonings, salts, and sauces.

3. The product claimed in claim 2 wherein the textured vegetable protein containing the absorbed fat is admixed with a sauce.

4. The product claimed in claim 3 wherein the sauce is a barbeque sauce.

5. The product claimed in claim 4 wherein the rendered animal fat is beef fat.

6. The product claimed in claim 5 wherein the textured vegetable protein is derived from soybeans.

7. The product claimed in claim 6 wherein the textured vegetable protein has first been deflavorized and hydrated by boiling in hot water, rinsing with water followed by rinsing with dilute sodium bicarbonate, partially dehydrated and then flavored by having absorbed thereon a minor amount of beef fat.

8. The product claimed in claim 1 wherein the weight ratio of animal fat to deflavorized partially dehydrated textured vegetable protein is about 1:9 to 1:2.

9. The product in claim 8 wherein the fat is a beef fat.

10. The product claimed in claim 8 wherein the fat is pork fat.

11. The product claimed in claim 8 wherein the fat is a poultry fat.

12. A process for producing a meat flavored textured vegetable protein product comprising the steps of
  a. treating a textured vegetable protein having an average particle diameter of ½ inch or larger by covering said textured vegetable protein with water in a vessel and heating said vessel until the water boils;
  b. rinsing the textured vegetable protein from step (a) with water;
  c. rinsing the textured vegetable protein from step (b) with a dilute solution of sodium bicarbonate;
  d. partially dehydrating the textured vegetable protein from step (c) to remove the loosely held water;
  e. comminuting the textured vegetable protein from step (d) into smaller sizes; and
  f. mixing the textured vegetable protein from step (e) with a minor amount of a hot animal fat until the fat is absorbed on the textured vegetable protein.

13. The process as claimed in claim 12 wherein the animal fat is beef fat.

14. The process as claimed in claim 12 wherein the product thus obtained is additionally admixed with a flavoring sauce.

15. The process as claimed in claim 14 wherein the flavoring sauce is a barbeque sauce.

* * * * *